United States Patent
Matthiesen

(10) Patent No.: US 9,821,715 B2
(45) Date of Patent: Nov. 21, 2017

(54) RETRACTABLE CATWALK AND RAILING DEVICE

(71) Applicant: Greg Matthiesen, Magnolia, MN (US)

(72) Inventor: Greg Matthiesen, Magnolia, MN (US)

(*) Notice: Subject to any disclaimer, the term of this patent is extended or adjusted under 35 U.S.C. 154(b) by 0 days.

(21) Appl. No.: 15/352,661

(22) Filed: Nov. 16, 2016

(65) Prior Publication Data

US 2017/0144603 A1    May 25, 2017

Related U.S. Application Data

(60) Provisional application No. 62/257,456, filed on Nov. 19, 2015.

(51) Int. Cl.
*B60R 3/00* (2006.01)
*B60R 3/02* (2006.01)

(52) U.S. Cl.
CPC .............. *B60R 3/005* (2013.01); *B60R 3/02* (2013.01)

(58) Field of Classification Search
CPC ................................. B60R 3/005; B60R 3/02
See application file for complete search history.

(56) References Cited

U.S. PATENT DOCUMENTS

| 278,301 | A | * | 5/1883 | Welsh | E06C 1/383 182/160 |
|---|---|---|---|---|---|
| 2,288,926 | A | * | 7/1942 | Strader | B62D 33/0273 105/458 |
| 3,414,081 | A | * | 12/1968 | Wedvik | E06C 1/383 182/160 |
| 4,029,355 | A | * | 6/1977 | Wilhelmsen | B62D 33/0273 108/134 |
| 5,213,367 | A | * | 5/1993 | Norman, Jr. | B60P 3/224 182/113 |
| 6,550,838 | B2 | * | 4/2003 | Bobbitt, III | B62D 33/037 292/175 |
| 6,598,704 | B2 | * | 7/2003 | Hansen | B60R 3/005 108/134 |
| 2009/0200108 | A1 | * | 8/2009 | Rathbone | E06C 9/12 182/84 |

* cited by examiner

*Primary Examiner* — Alvin Chin-Shue

(57) ABSTRACT

A retractable catwalk and railing device facilitates movement of a catwalk and rail between a storage position to a use position. The device includes a first and second mounting brackets in a spaced horizontally aligned relationship on a vertical surface. A catwalk is pivotable between a stored position and a deployed position between the first and second mounting brackets. A lip extends upwardly from the first mounting bracket. A flange is movably coupled to the catwalk to abut the lip when the catwalk is in the stored position retaining the catwalk in the stored position. The flange is movable relative to the catwalk to disengage from the lip allowing the catwalk to be pivoted into the deployed position. A rail is pivotally coupled to the catwalk.

9 Claims, 7 Drawing Sheets

RETRACTABLE CATWALK AND RAILING DEVICE

CROSS-REFERENCE TO RELATED APPLICATIONS

This application claims benefit of the filing of the provisional application 62/257,456 filed on Nov. 19, 2015.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art including information disclosed under 37 CFR 1.97 and 1.98

The disclosure and prior art relates to catwalk devices and more particularly pertains to a new catwalk device for facilitating movement of a catwalk between a storage position to a use position.

BRIEF SUMMARY OF THE INVENTION

An embodiment of the disclosure meets the needs presented above by generally comprising a first and second mounting brackets in a spaced horizontally aligned relationship on a vertical surface. A catwalk is pivotable between a stored position and a deployed position between the first and second mounting brackets. A lip extends upwardly from the first mounting bracket. A flange is movably coupled to the catwalk to abut the lip when the catwalk is in the stored position retaining the catwalk in the stored position. The flange is movable relative to the catwalk to disengage from the lip allowing the catwalk to be pivoted into the deployed position. A rail is pivotally coupled to the catwalk.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
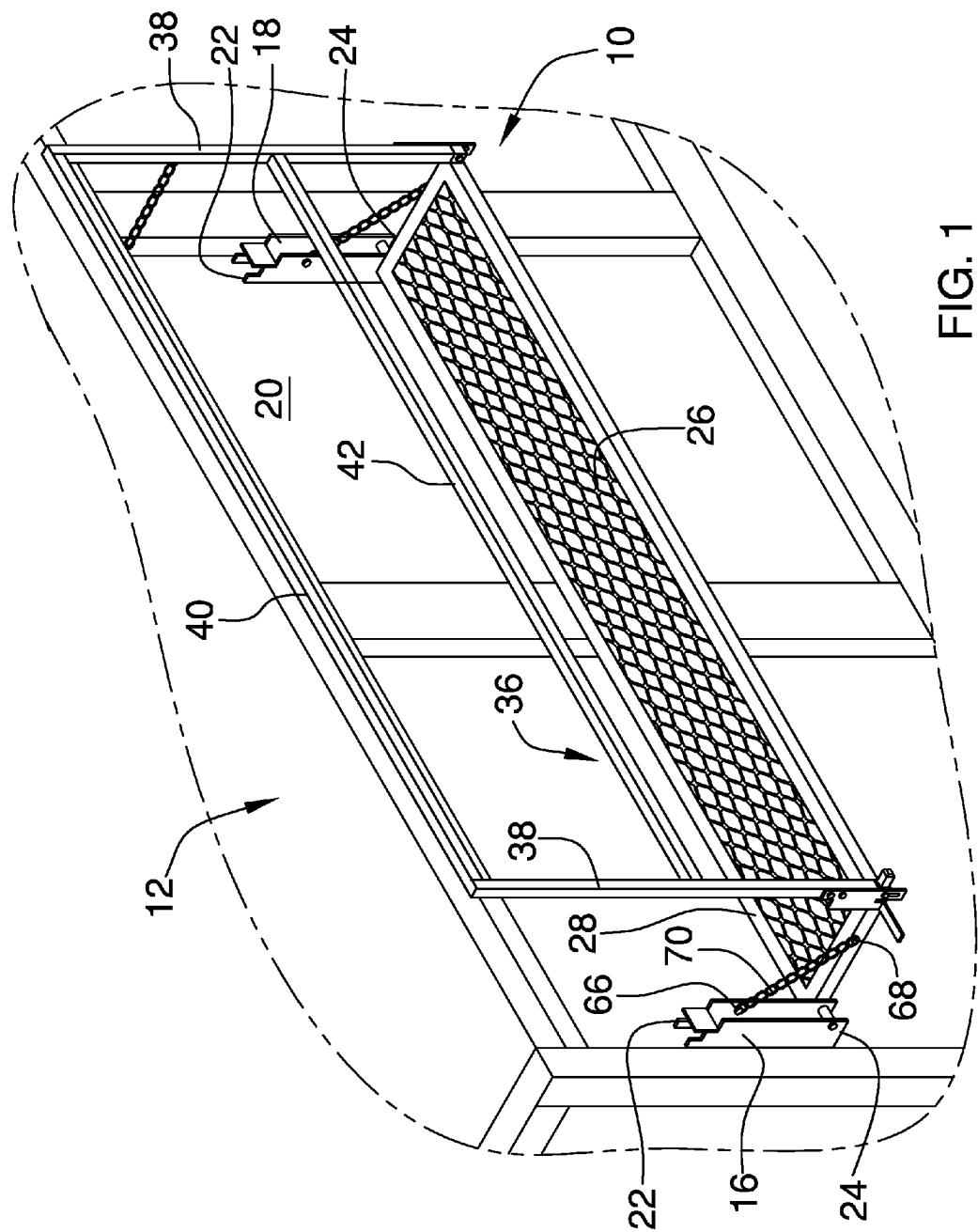
FIG. 1 is a top front side perspective view of a retractable catwalk and railing device according to an embodiment of the disclosure.
Figure 3:
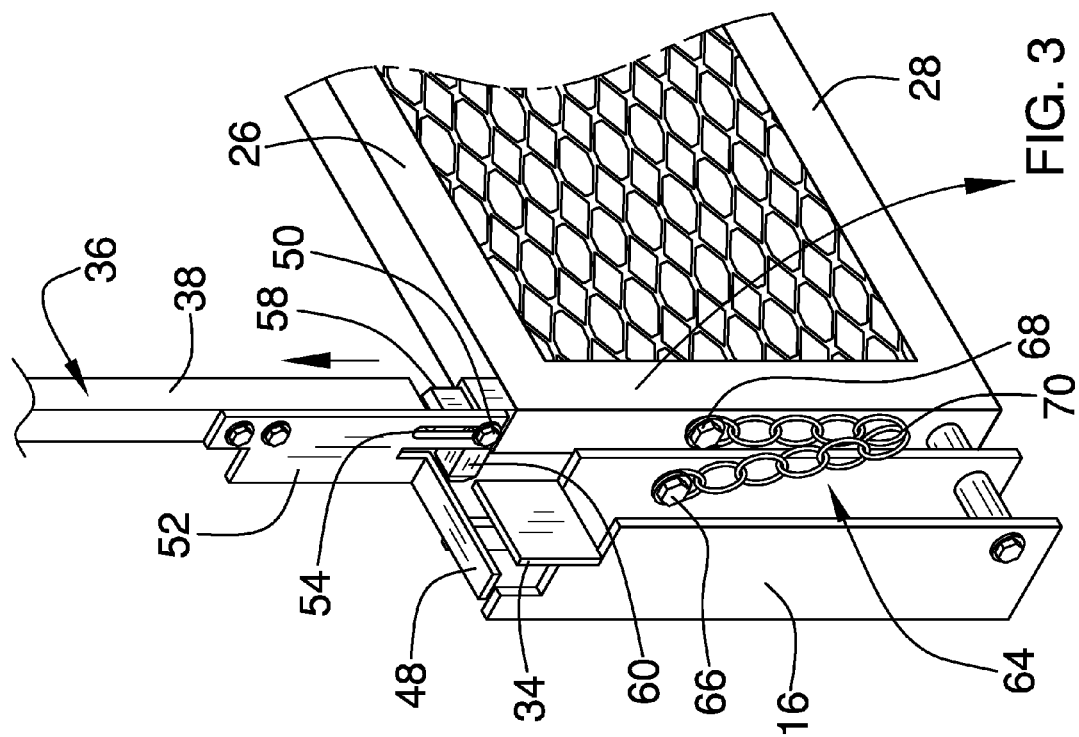
FIG. 3 is a partial top front side perspective view of an embodiment of the disclosure in use.
Figure 2:
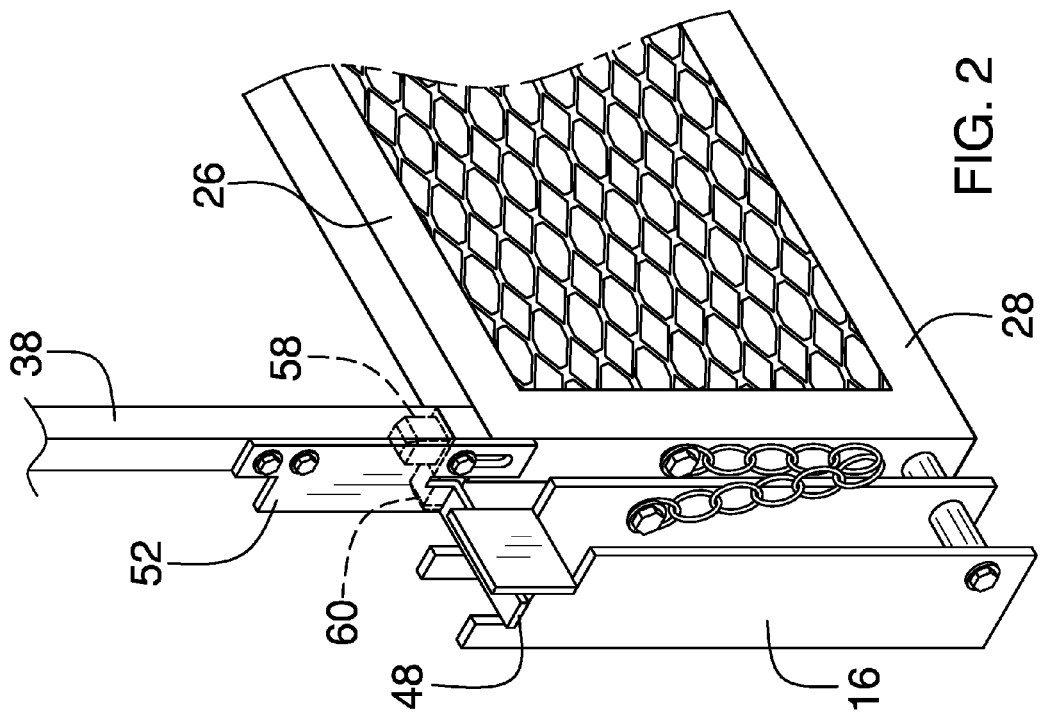
FIG. 2 is a partial top front side perspective view of an embodiment of the disclosure in a storage position.
Figure 4:
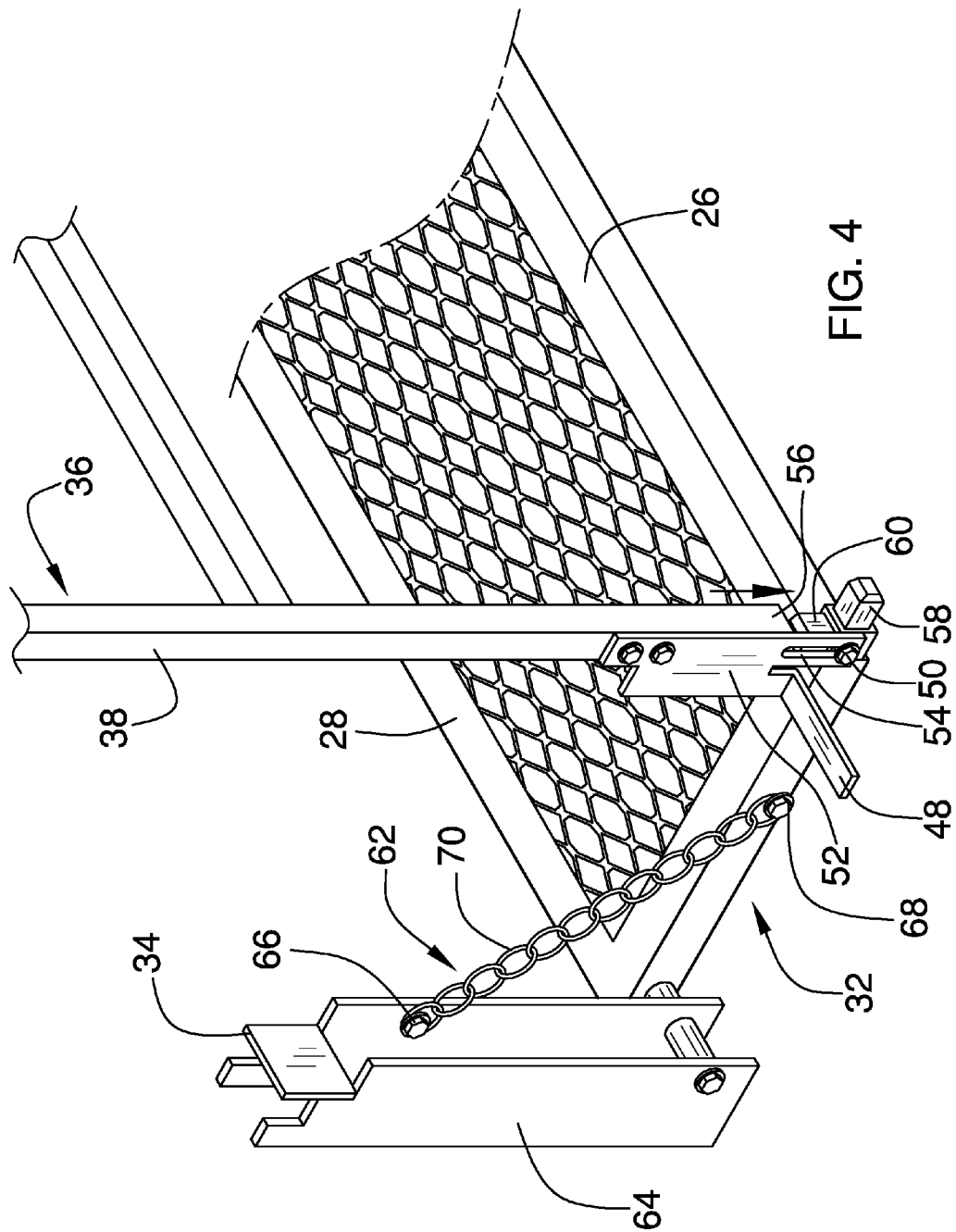
FIG. 4 is a partial top front side perspective view of an embodiment of the disclosure in use.
Figure 5:
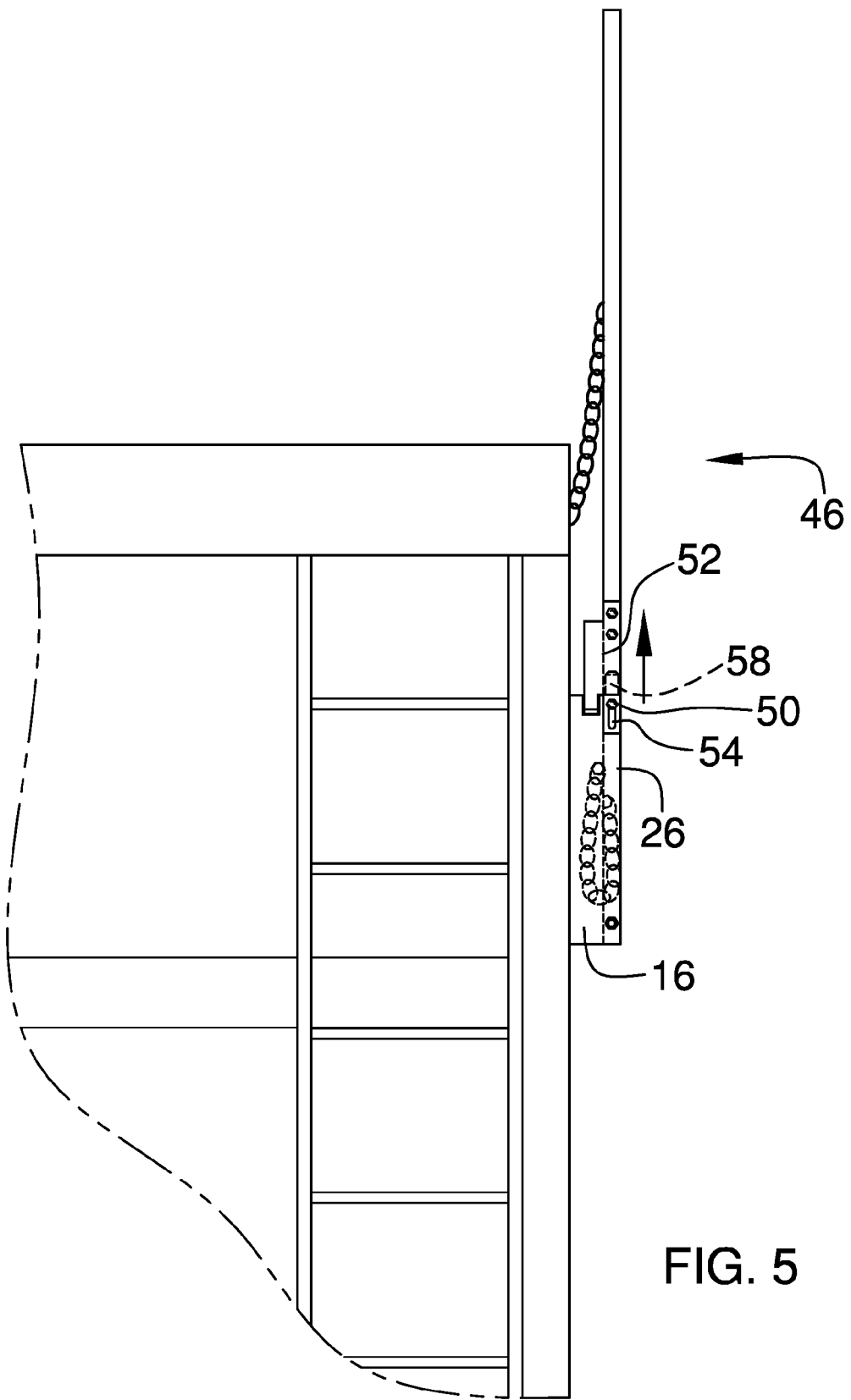
FIG. 5 is a side view of an embodiment of the disclosure in a stored position.
Figure 6:
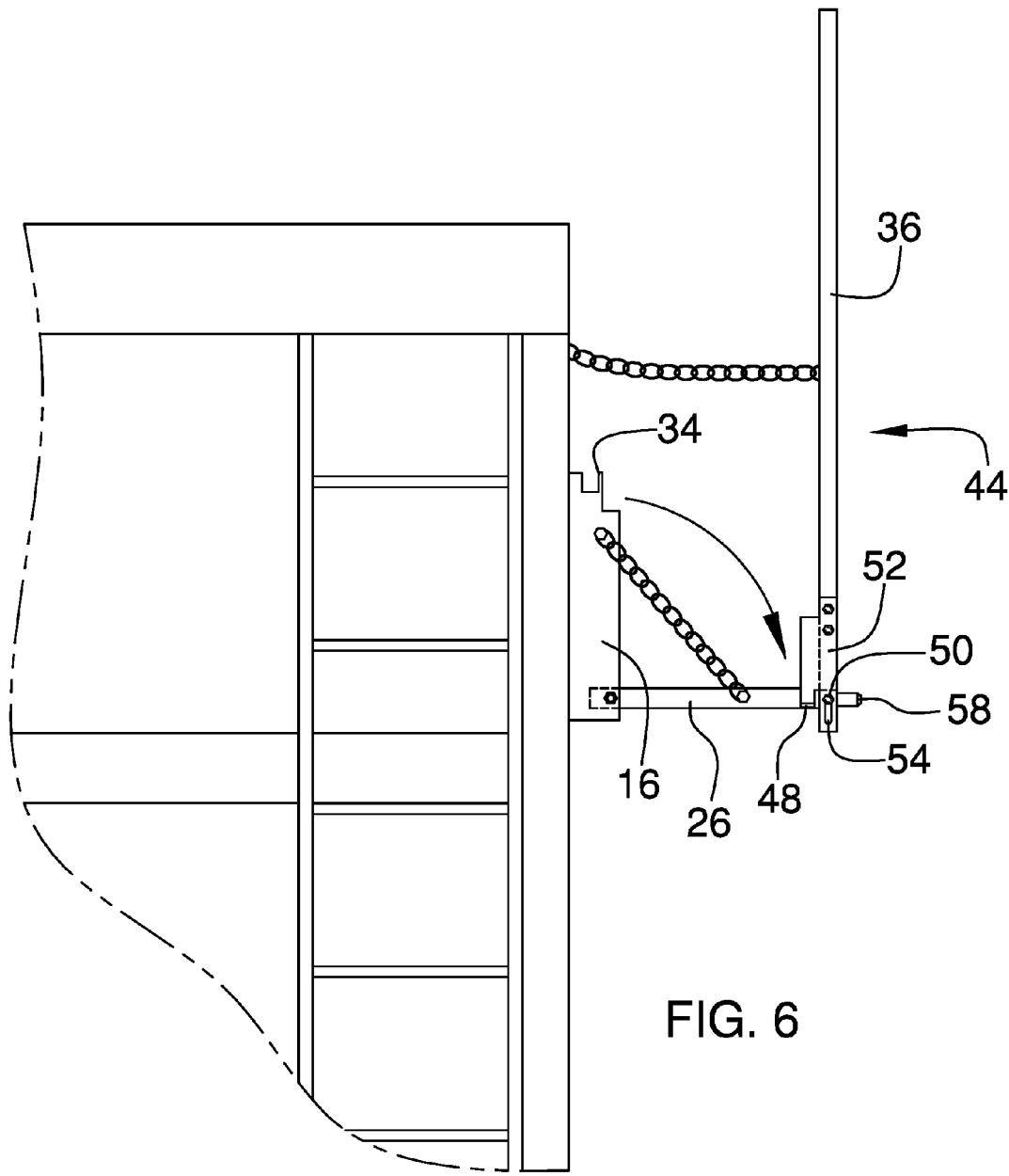
FIG. 6 is a side view of an embodiment of the disclosure in a deployed position.
Figure 7:
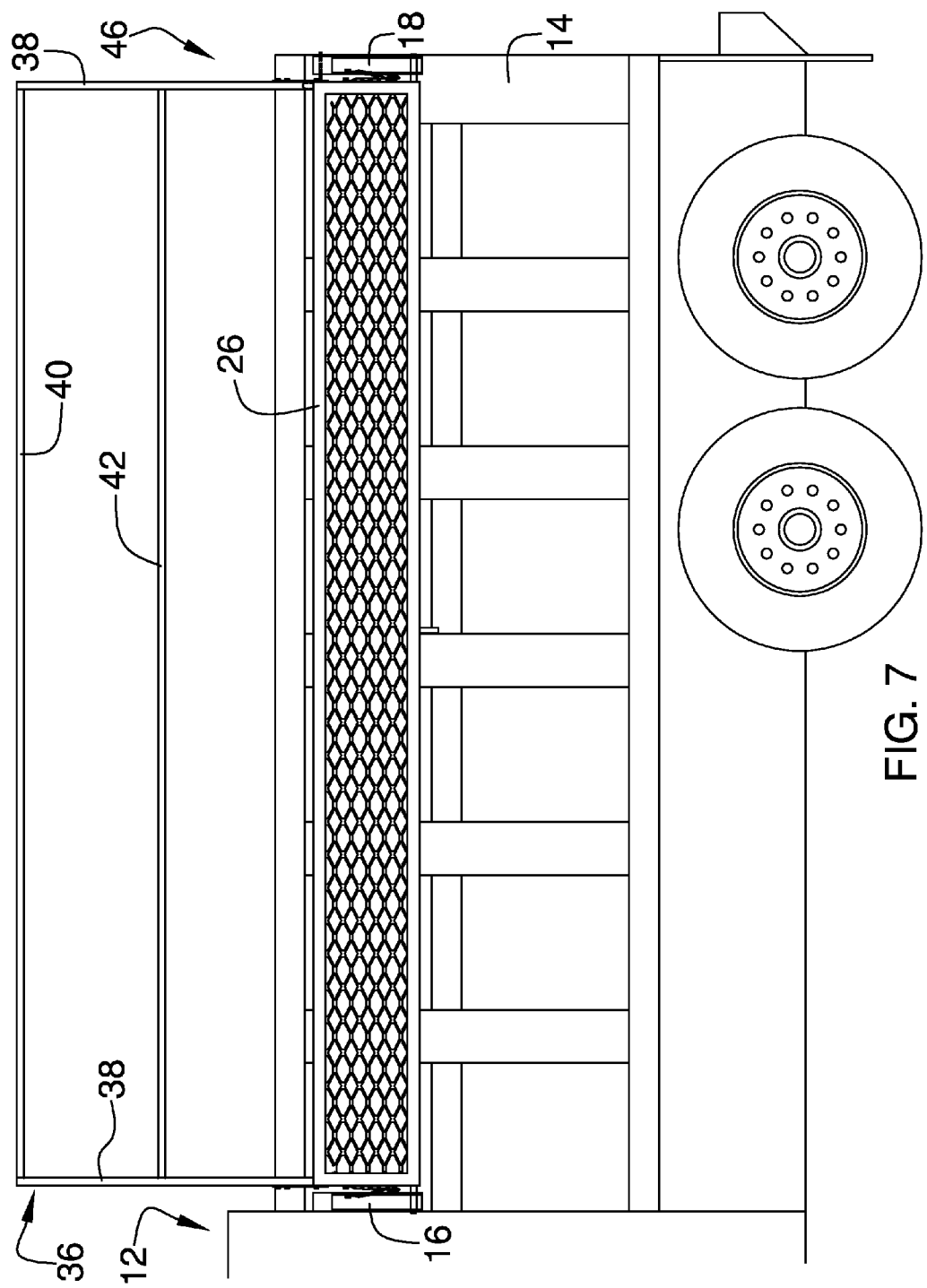
FIG. 7 is a front view of an embodiment of the disclosure in a stored position.
Figure 8:
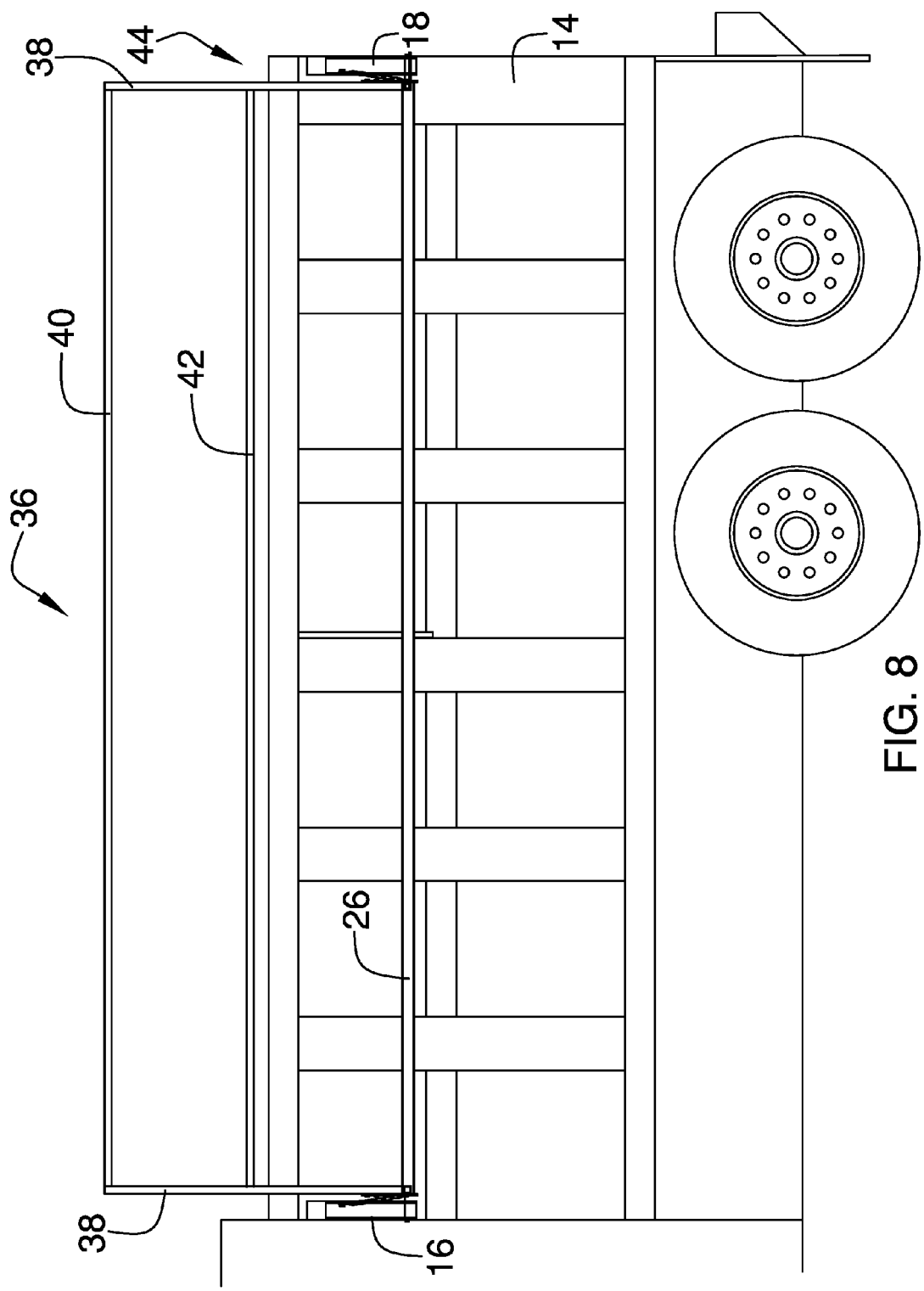
FIG. 8 is a front view of an embodiment of the disclosure in a deployed position.

With reference now to the drawings, and in particular to FIGS. 1 through 8 thereof, a new catwalk device embodying the principles and concepts of an embodiment of the disclosure and generally designated by the reference numeral 10 will be described.

As best illustrated in FIGS. 1 through 8, the retractable catwalk and railing device 10 generally comprises a vehicle 12 having a trailer 14. Each of a first mounting bracket 16 and a second mounting bracket 18 are coupled to a vertical surface 20 of the trailer 14 in spaced horizontally aligned relationship to each other on the trailer 14. Each of the first mounting bracket 16 and the second mounting bracket 18 have a respective upper end 22 and a respective lower end 24.

A catwalk 26 is positioned to extend between the first mounting bracket 16 and the second mounting bracket 18. The catwalk 26 has a first longitudinal side 28 pivotally coupled to each of the first mounting bracket 16 and the second mounting bracket 18 wherein the catwalk 26 is pivotable between a stored position 30 and a deployed position 32. The catwalk 26 is substantially coplanar with the first mounting bracket 16 and the second mounting bracket 18 in the stored position 30. The catwalk 26 is substantially perpendicular to the first mounting bracket 16 and the second mounting bracket 18 in the deployed position 32. Thus, the catwalk 26 is perpendicular to the trailer or box of the vehicle 12 allowing a person to walk and be supported on the catwalk 26 in the deployed position 32.

A lip 34 extends upwardly from the first mounting bracket 16. A rail 36 is pivotally coupled to the catwalk 26. The rail 36 may incorporate a pair of end members 38, a top railing 40 extending between respective top ends of the end members 38, and a medial brace 42 extending between the end members 38. The rail 36 is movable between a use position 44 substantially perpendicular to the catwalk 26 and a storage position 46 substantially coplanar with the catwalk 26.

A flange 48 is movably coupled to the catwalk 26. The flange 48 is positioned to abut the lip 34 when the catwalk 26 is in the stored position 30 whereby the flange 48 retains the catwalk 26 in the stored position 30. The flange 48 is movable relative to the catwalk 26 to disengage from the lip 34 allowing the catwalk 26 to be pivoted into the deployed position 32. The flange 48 is coupled to and extends from the rail 36 wherein the flange 48 is positionable to abut the lip 34 when the rail 36 is in the storage position 46 and the catwalk 26 is in the stored position 30.

A pin 50 is coupled to and extends from the catwalk 26. A pivot plate 52 is coupled to the rail 36. The pivot plate 52 is structured to have an elongated slot 54 therein. The pin 50 extends through the slot 54 wherein the pivot plate 52 is slidably and pivotally coupled to the catwalk 26 by the pin 50. The pin 50 may have a head, be a bolt utilizing a nut, or be another conventional structure to retain the pivot plate 52 on the pin 50 while allowing the pin 50 to move freely in the slot 54. A collar 56 is coupled to the pivot plate 52 in a fixed position relative to the pivot plate 52 and therefore, also the rail 36. A rail storage projection 58 is coupled to and extends from the catwalk 26. The rail storage projection 58 remains in a fixed position relative to the catwalk 26. The rail 36 is movable to insert the rail storage projection 58 into the collar 56 wherein the rail 36 is held in the storage position 46. A rail use projection 60 is coupled to and extends from the catwalk 26. The rail use projection 60 is in a fixed position relative to the catwalk 26. The rail 36 is movable to insert the rail use projection 60 into the collar 56 wherein the rail 36 is held in the use position 44.

A stop mechanism 62 is coupled to the catwalk 26 and at least one of the first mounting bracket 16 and the second mounting bracket 18 such that the stop mechanism 62 prevents the catwalk 26 from pivoting beyond the deployed position 32. The stop mechanism 62 comprises a tether 64 having a first end 66 coupled to one of the first mounting bracket 16 and the second mounting bracket 18. A second end 68 of the tether 64 is coupled to the catwalk 26 at a position offset from a pivotal axis of the catwalk 26 about the first mounting bracket 16 and the second mounting bracket 18. The tether 64 as shown is a chain 70. As shown, in the drawing figures, the first mounting bracket 16 is used as an example. However, respective tethers may be used at each end of the catwalk 26 as would be understood by one skilled in the art.

A rail safety stop 72 may be provided comprising a tie 74 having a first end 76 coupled to the vehicle 12 and a second end 78 coupled to the rail 36 to prevent the rail from being pivoted past the use position 44.

In use, from the stored position 30 the rail 36 is manipulated to disengage the collar 56 from the rail storage projection 58. This action also disengages the flange 48 from the lip 34 allowing the catwalk 26 to be pivoted into the deployed position 32. With the catwalk 26 in the deployed position 32, the collar 56 is positioned over the rail use projection 60 to hold the rail 36 in the use position 44. Lifting of the rail 36 will then disengage the collar 56 from the rail use projection 60 allowing the catwalk 26 and rail 36 to be moved back towards the first mounting bracket 16 to re-engage the flange 48 to the lip 34. A pole or other extension may be used to assist in lifting the rail 36 for deployment or storage. The device 10 as described may be utilized on one side of the catwalk 26 or mirrored structure may be used with both the first mounting bracket 16 and the second mounting bracket 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A catwalk device comprising:
   a first mounting bracket and a second mounting bracket each being configured for being coupled to a vertical surface in spaced horizontally aligned relationship to each other, each of said first mounting bracket and said second mounting bracket having a respective upper end and a respective lower end;
   a catwalk positioned to extend between said first mounting bracket and said second mounting bracket, said catwalk having a first longitudinal side pivotally coupled to each of said first mounting bracket and said second mounting bracket wherein said catwalk is pivotable between a stored position and a deployed position, said catwalk being substantially coplanar with said first mounting bracket and said second mounting bracket in said stored position, said catwalk being substantially perpendicular to said first mounting bracket and said second mounting bracket in said deployed position;
   a lip extending upwardly from said first mounting bracket;
   a flange, said flange being movably coupled to said catwalk, said flange being positioned to abut said lip when said catwalk is in said stored position whereby said flange retains said catwalk in said stored position, said flange being movable relative to said catwalk to disengage from said lip allowing said catwalk to be pivoted into said deployed position; and
   a rail, said rail being pivotally coupled to said catwalk, said rail being movable between a use position substantially perpendicular to said catwalk and a storage position substantially coplanar with said catwalk, further comprising said flange being fixedly coupled to and extending from said rail wherein said flange is positionable to abut said lip when said rail is in said storage position and said catwalk is in said stored position.

2. The device of claim 1, further comprising a stop mechanism coupled to said catwalk and at least one of said first mounting bracket and said second mounting bracket such that said stop mechanism prevents said catwalk from pivoting beyond said deployed position.

3. The device of claim 2, further comprising said stop mechanism comprising a tether having a first end coupled to one of said first mounting bracket and said second mounting bracket and a second end coupled to said catwalk at a position offset from a pivotal axis of said catwalk about said first mounting bracket and said second mounting bracket.

4. The device of claim 3, further comprising said tether being a chain.

5. The device of claim 1, further comprising:
a pin coupled to and extending from said catwalk; and
a pivot plate coupled to said rail, said pivot plate being structured to have an elongated slot therein, said pin extending through said slot wherein said pivot plate is slidably and pivotally coupled to said catwalk by said pin.

6. The device of claim 5, further comprising:
a collar coupled to said pivot plate; and
a rail storage projection coupled to and extending from said catwalk, said rail being movable to insert said rail storage projection into said collar wherein said rail is held in said storage position.

7. The device of claim 5, further comprising:
a collar coupled to said pivot plate; and
a rail use projection coupled to and extending from said catwalk, said rail being movable to insert said rail use projection into said collar wherein said rail is held in said use position.

8. A catwalk device comprising:
a first mounting bracket and a second mounting bracket each being configured for being coupled to a vertical surface in spaced horizontally aligned relationship to each other, each of said first mounting bracket and said second mounting bracket having a respective upper end and a respective lower end;
a catwalk positioned to extend between said first mounting bracket and said second mounting bracket, said catwalk having a first longitudinal side pivotally coupled to each of said first mounting bracket and said second mounting bracket wherein said catwalk is pivotable between a stored position and a deployed position, said catwalk being substantially coplanar with said first mounting bracket and said second mounting bracket in said stored position, said catwalk being substantially perpendicular to said first mounting bracket and said second mounting bracket in said deployed position;
a lip extending upwardly from said first mounting bracket;
a rail, said rail being pivotally coupled to said catwalk, said rail being movable between a use position substantially perpendicular to said catwalk and a storage position substantially coplanar with said catwalk;
a flange, said flange being movably coupled to said catwalk, said flange being positioned to abut said lip when said catwalk is in said stored position whereby said flange retains said catwalk in said stored position, said flange being movable relative to said catwalk to disengage from said lip allowing said catwalk to be pivoted into said deployed position, said flange being coupled to and extending from said rail wherein said flange is positionable to abut said lip when said rail is in said storage position and said catwalk is in said stored position;
a pin coupled to and extending from said catwalk;
a pivot plate coupled to said rail, said pivot plate being structured to have an elongated slot therein, said pin extending through said slot wherein said pivot plate is slidably and pivotally coupled to said catwalk by said pin;
a collar coupled to said pivot plate;
a rail storage projection coupled to and extending from said catwalk, said rail being movable to insert said rail storage projection into said collar wherein said rail is held in said storage position;
a rail use projection coupled to and extending from said catwalk, said rail being movable to insert said rail use projection into said collar wherein said rail is held in said use position; and
a stop mechanism coupled to said catwalk and at least one of said first mounting bracket and said second mounting bracket such that said stop mechanism prevents said catwalk from pivoting beyond said deployed position, said stop mechanism comprising a tether having a first end coupled to one of said first mounting bracket and said second mounting bracket and a second end coupled to said catwalk at a position offset from a pivotal axis of said catwalk about said first mounting bracket and said second mounting bracket, said tether being a chain.

9. A catwalk device comprising:
a vehicle having a trailer;
a first mounting bracket and a second mounting bracket each being coupled to a vertical surface in spaced horizontally aligned relationship to each other on said trailer, each of said first mounting bracket and said second mounting bracket having a respective upper end and a respective lower end;
a catwalk positioned to extend between said first mounting bracket and said second mounting bracket, said catwalk having a first longitudinal side pivotally coupled to each of said first mounting bracket and said second mounting bracket wherein said catwalk is pivotable between a stored position and a deployed position, said catwalk being substantially coplanar with said first mounting bracket and said second mounting bracket in said stored position, said catwalk being substantially perpendicular to said first mounting bracket and said second mounting bracket in said deployed position;
a lip extending upwardly from said first mounting bracket;
a rail, said rail being pivotally coupled to said catwalk, said rail being movable between a use position substantially perpendicular to said catwalk and a storage position substantially coplanar with said catwalk;
a flange, said flange being movably coupled to said catwalk, said flange being positioned to abut said lip when said catwalk is in said stored position whereby said flange retains said catwalk in said stored position, said flange being movable relative to said catwalk to disengage from said lip allowing said catwalk to be pivoted into said deployed position, said flange being coupled to and extending from said rail wherein said flange is positionable to abut said lip when said rail is in said storage position and said catwalk is in said stored position;
a pin coupled to and extending from said catwalk;
a pivot plate coupled to said rail, said pivot plate being structured to have an elongated slot therein, said pin extending through said slot wherein said pivot plate is slidably and pivotally coupled to said catwalk by said pin;
a collar coupled to said pivot plate;

a rail storage projection coupled to and extending from said catwalk, said rail being movable to insert said rail storage projection into said collar wherein said rail is held in said storage position;

a rail use projection coupled to and extending from said catwalk, said rail being movable to insert said rail use projection into said collar wherein said rail is held in said use position; and a stop mechanism coupled to said catwalk and at least one of said first mounting bracket and said second mounting bracket such that said stop mechanism prevents said catwalk from pivoting beyond said deployed position, said stop mechanism comprising a tether having a first end coupled to one of said first mounting bracket and said second mounting bracket and a second end coupled to said catwalk at a position offset from a pivotal axis of said catwalk about said first mounting bracket and said second mounting bracket, said tether being a chain.

* * * * *